(12) United States Patent
Yin et al.

(10) Patent No.: US 10,459,296 B2
(45) Date of Patent: Oct. 29, 2019

(54) CURVED DISPLAY DEVICE AND DISPLAY PANEL THEREOF

(71) Applicant: Wuhan China Star Optoelectronics Technology Co., Ltd., Wuhan, Hubei (CN)

(72) Inventors: Bingkun Yin, Hubei (CN); Wanting Yin, Hubei (CN); Cong Tan, Hubei (CN); Hung-ming Shen, Hubei (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 0 days.

(21) Appl. No.: 15/910,600

(22) Filed: Mar. 2, 2018

(65) Prior Publication Data

US 2019/0196241 A1 Jun. 27, 2019

Related U.S. Application Data

(63) Continuation of application No. PCT/CN2018/073276, filed on Jan. 18, 2018.

(30) Foreign Application Priority Data

Dec. 27, 2017 (CN) .......................... 2017 1 1447159

(51) Int. Cl.
*G02F 1/1339* (2006.01)
*G02F 1/1335* (2006.01)
*G02F 1/1368* (2006.01)

(52) U.S. Cl.
CPC ........ *G02F 1/13394* (2013.01); *G02F 1/1339* (2013.01); *G02F 1/1368* (2013.01);
(Continued)

(58) Field of Classification Search
CPC .. G02F 1/13394; G02F 1/1339; G02F 1/1335; G02F 1/133514; G02F 1/133305;
(Continued)

(56) References Cited

U.S. PATENT DOCUMENTS

2013/0308084 A1* 11/2013 Niwano ................ G02F 1/1339
349/155
2018/0101041 A1* 4/2018 Kim .................. G02F 1/133305

FOREIGN PATENT DOCUMENTS

CN 103955096 A 7/2014
CN 104849917 A 8/2015
(Continued)

*Primary Examiner* — Thoi V Duong
(74) *Attorney, Agent, or Firm* — Hemisphere Law, PLLC; Zhigang Ma

(57) ABSTRACT

The present invention provides a curved display device and a display panel thereof. The display panel includes a CF substrate, a TFT substrate, a plurality of photo spacers, a liquid crystal layer and a sealing layer. The liquid crystal layer is located between the CF and the TFT substrates, the plurality of photo spacers is disposed on a surface of the CF substrate facing the TFT substrate, the sealing layer is disposed between the CF and the TFT substrates and surrounds an edge of the liquid crystal layer, the liquid crystal layer includes an intermediate region and two edge regions located at two sides of the intermediate region, a stress generated from the photo spacers located in the intermediate region on the liquid crystals in the intermediate region is smaller than that generated from the photo spacers located in the edge regions on the liquid crystals in the edge regions.

14 Claims, 3 Drawing Sheets

(52) U.S. Cl.
CPC .............. *G02F 1/133514* (2013.01); *G02F 2001/13396* (2013.01)

(58) Field of Classification Search
CPC ...... G02F 1/136; G02F 1/1368; G02F 1/1333; G02F 1/1362; G02F 2001/13396; H01L 51/0097; G09F 9/301; G09F 9/35
See application file for complete search history.

(56) References Cited

FOREIGN PATENT DOCUMENTS

| | | | | |
|---|---|---|---|---|
| CN | 107329333 A | 11/2017 | | |
| JP | S56-167125 A | 12/1981 | | |
| JP | 2017-181888 A | 10/2017 | | |
| WO | WO 2016/192152 | * 12/2016 | ........... | G02F 1/1339 |

\* cited by examiner

CURVED DISPLAY DEVICE AND DISPLAY PANEL THEREOF

RELATED APPLICATIONS

The present application is a National Phase of International Application Number PCT/CN2018/073276, filed Jan. 18, 2018, and claims the priority of China Application No. 201711447159.8, filed Dec. 27, 2017.

FIELD OF THE DISCLOSURE

The disclosure relates to a curved liquid crystal display technical field, and more particularly to a curved display device and a display panel thereof.

BACKGROUND

Curved liquid crystal displays with the features of ultra-thin, light weight, flexible, high degree of freedom of design has broad market prospects in wearable, mobile communications, television, commercials and military applications. However, during the bending or folding of the curved liquid crystal display panel, due to the inconsistent compression of photo spacers, PS in different areas of the display area caused by the stress, the stress of the photo spacers in the middle area on the liquid crystals in the middle area is larger, thereby causing the liquid crystals in the middle area to diffuse to the edge regions on both sides, resulting in uneven distribution of the liquid crystal in the liquid crystal layer, so that the length of the liquid crystal layer in the edge region is larger than the length of the liquid crystal layer in the intermediate region. The difference in the length of the liquid crystal layer results in optical path difference, affecting the quality of the display.

SUMMARY

In order to solve the insufficient of the conventional technology, the present invention provides a curved display device and a display panel thereof, to reduce the stress on the liquid crystal caused by the photo spacer in the intermediate region, and to prevent the liquid crystal from diffusing to the edge region and occurring the difference in the length of the liquid crystal layer and improve the quality of the display.

A specific technical solution proposed by the present invention is to provide a display panel, the display panel including: a color filter, CF substrate, a thin film transistor, TFT substrate, a plurality of photo spacers, a liquid crystal layer and a sealing layer, wherein the liquid crystal layer is disposed between the CF substrate and the TFT substrate, the plurality of photo spacers is disposed on a surface of the CF substrate facing the TFT substrate, the sealing layer is disposed between the CF substrate and the TFT substrate and surrounds an edge of the liquid crystal layer, the liquid crystal layer includes an intermediate region and two edge regions located at two sides of the intermediate region, a stress generated from the photo spacers located in the intermediate region on the liquid crystals in the intermediate region is smaller than the stress generated from the photo spacers located in the edge regions on the liquid crystals in the edge regions, to keep the CF substrate and the TFT substrate at a constant gap.

Alternatively, the photo spacers located in the two edge regions are symmetrical to the intermediate region, the photo spacers located in the intermediate region are symmetrical to a central axis of the CF substrate.

Alternatively, heights of the photo spacers in the intermediate region are smaller than the heights of the photo spacers in the edge region.

Alternatively, heights of the photo spacers located in the intermediate region gradually increase in a direction from the intermediate region to the edge region.

Alternatively, heights of the photo spacers located in the edge region gradually increase in a direction from the intermediate region to the edge region.

Alternatively, a density of the photo spacers in the intermediate region is smaller than the heights of the photo spacers in the edge region.

Alternatively, the density of the photo spacers located in the intermediate region gradually increases in a direction from the intermediate region to the edge region, and/or the density of the photo spacers located in the edge region gradually increases in a direction from the intermediate region to the edge region.

Alternatively, a maximum length in the direction parallel to the CF substrate of the photo spacers in the intermediate region is smaller than the maximum length in the direction parallel to the CF substrate of the photo spacers located in the edge region.

Alternatively, the maximum length in the direction parallel to the CF substrate of the photo spacers located in the intermediate region gradually increases in a direction from the intermediate region to the edge region, and/or the maximum length in the direction parallel to the CF substrate of the photo spacers located in the edge region gradually increases in a direction from the intermediate region to the edge region.

The present invention further provides a curved display device, which includes the display panel as described above.

The display panel provided by the present invention includes a liquid crystal layer and a plurality of photo spacers, the plurality of spacers is disposed on a surface of the CF substrate facing the TFT substrate, the liquid crystal layer includes an intermediate region and two edge regions located on two sides of the intermediate region, the stress generated from the of the photo spacers located in the intermediate region on the liquid crystal in the intermediate region is smaller than the stress generated from the of the photo spacers located in the edge region on the liquid crystal in the edge region, so that the liquid crystal in the intermediate region can be prevented from diffusing to the edge regions on both sides to cause a difference in the length of the liquid crystal layer, so as to maintain a constant gap between the CF substrate and the TFT substrate and improve the quality of the display.

DETAILED DESCRIPTION OF PREFERRED EMBODIMENTS

Figure 1:
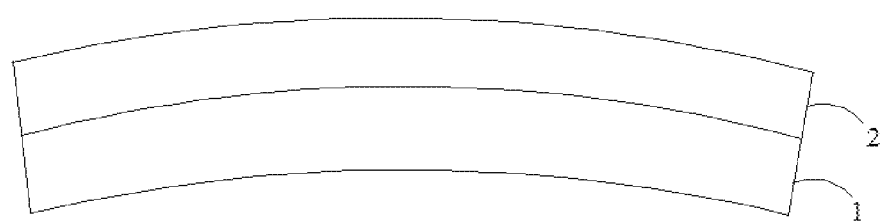
FIG. 1 is a schematic structural view of the curved display device in a first embodiment.

Hereinafter, embodiments of the present invention will be described in detail with reference to the accompanying drawings. However, the invention may be embodied in many different forms and should not be construed as limited to the specific embodiments set forth herein. Rather, these embodiments are provided to explain the principles of the invention and its practical application to thereby enable those of ordinary skill in the art to understand various embodiments of the invention and various modifications as are suited to the particular use contemplated. In the drawings, the same reference numerals will always be used to refer to the same elements.

The display panel in the present invention includes a color filter, CF substrate, a thin film transistor, TFT substrate, a plurality of photo spacers, a liquid crystal layer and a sealing layer, the liquid crystal layer is disposed between the CF substrate and the TFT substrate, the plurality of photo spacers is disposed on a surface of the CF substrate facing the TFT substrate. The sealing layer is disposed between the CF substrate and the TFT substrate and surrounds an edge of the liquid crystal layer. The liquid crystal layer includes an intermediate region and two edge regions located at two sides of the intermediate region, a stress generated from the photo spacers located in the intermediate region on the liquid crystals in the intermediate region is smaller than the stress generated from the photo spacers located in the edge regions on the liquid crystals in the edge regions, so as to prevent the liquid crystal in the intermediate region from diffusing to the edge regions on both sides to cause a difference in the length of the liquid crystal layer, to keep the CF substrate and the TFT substrate at a constant gap, and improve the quality of the display.

The structure of the display panel of the present invention will be described below by using several specific embodiments. Certainly, these specific embodiments are merely shown as examples, and are not intended to limit the present invention.

First Embodiment

Figure 2:
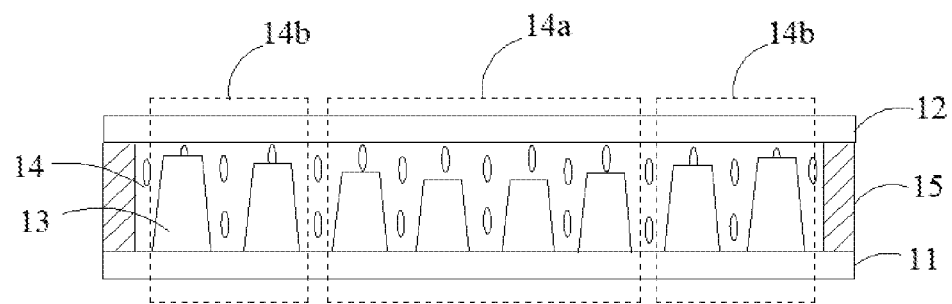
FIG. 2 is a schematic structural view of the display panel before bending in the first embodiment.
Figure 3:
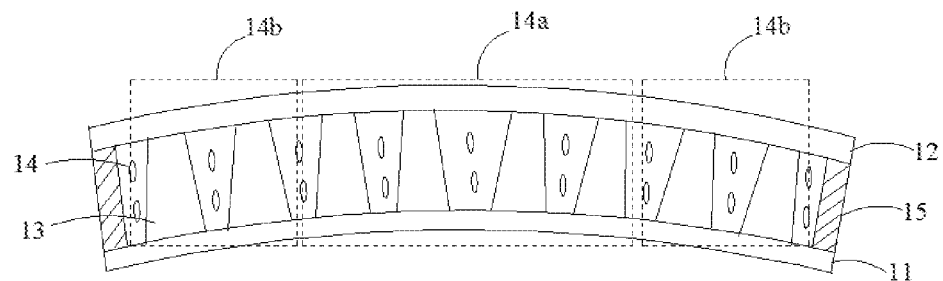
FIG. 3 is a schematic structural view of the display panel after bending in the first embodiment.

Referring to FIG. 1, FIG. 2 and FIG. 3, the curved display device in this embodiment includes a display panel 1 and a backlight module 2, the display panel 1 is a curved display panel, the backlight module 2 is a flexible backlight module, the backlight module 2 is for providing a light source to the display panel 1. Specifically, the display panel 1 includes a CF substrate 11, a TFT substrate 12, a plurality of photo spacers 13, a liquid crystal layer 14 and a sealing layer 15. The liquid crystal layer 14 is located between the CF substrate 11 and the TFT substrate 12. The plurality of photo spacers 13 is disposed on a surface of the CF substrate 11 facing the TFT substrate 12. The sealing layer 15 is disposed between the CF substrate 11 and the TFT substrate 12 and surrounds an edge of the liquid crystal layer 14. The liquid crystal layer 14 includes an intermediate region 14a and two edge regions 14b located at two sides of the intermediate region.

The CF substrate 11 is disposed opposite to the TFT substrate 12 and form a sealed chamber with the sealing layer 15. The plurality of photo spacers 13 is disposed in the sealed chamber, liquid crystals of the liquid crystal layer 14 are filled in the sealed chamber. In particular, the photo spacers 13 located in the two edge regions 14b are symmetrical to the intermediate region 14a, the photo spacers located in the intermediate region 14a are symmetrical to a central axis of the CF substrate 11. Heights of the photo spacers 13 in the intermediate region 14a are smaller than the heights of the photo spacers 13 in the edge region 14b. In this embodiment, the photo spacers 13 are columnar, and the material is a material with a certain elasticity.

During a bending process of the display panel 13, the photo spacers 13 will be deformed, the photo spacers 13 will generate a certain stress on the liquid crystal in the liquid crystal layer 14 under its own elastic deformation force, since the stress applied to the portion corresponding to the CF substrate 11, the TFT substrate 12 and the intermediate region 14a is the largest, the squeeze force applied to the liquid crystal in the intermediate region 14a is also maximized. Therefore, the liquid crystals located in the intermediate region 14a will diffuse to the edge regions 14b on both sides, by setting the heights of the photo spacers 13 in the intermediate region 14a smaller than the heights of the photo spacers 13 in the edge region 14b, so that the photo spacers 13 located in the edge region 14b can block the liquid crystals in the intermediate region 14a from diffusion to the edge regions 14b on both sides, in addition, since the photo spacers 13 located in the edge region 14b are larger in height, its own elastic deformation force is also relatively larger, the liquid crystals in the edge region 14b are also subjected to a larger stress, so that it is possible to further prevent the liquid crystals located in the intermediate region from diffusion to the edge regions 14b on both sides.

The heights of the photo spacers 13 located in the intermediate region 14a gradually increase in the direction from the intermediate region 14a to the edge region 14b, it can be equal increments, that is, an interval between any two adjacent column of the photo spacers 13 is equal, or it can also be unequal value increments, that is, the interval between any two adjacent column of the photo spacers 13 is not completely equal or unequal, in this case, the height of the photo spacers 13 in the edge region 14b along the direction from the intermediate region 14a to the edge region 14b may be equal, or may not be equal.

The heights of the photo spacers 13 located in the edge region 14b gradually increase in the direction from the intermediate region 14a to the edge region 14b, it can be equal increments, that is, an interval between any two adjacent column of the photo spacers 13 is equal, or it can also be unequal value increments, that is, the interval between any two adjacent column of the photo spacers 13 is not completely equal or unequal, in this case, the height of the photo spacers 13 in the intermediate region 14a along the direction from the intermediate region 14a to the edge region 14b may be equal, or may not be equal.

Preferably, the heights of the photo spacers 13 located in the intermediate region 14a increases successively in the direction from the intermediate region 14a to the edge region 14b, and the heights of the photo spacers 13 in the edge region 14b increases successively in the direction from the intermediate region 14a to the edge regions 14b, that is, the photo spacers 13 located in the intermediate region 14a and the photo spacers 13 located in the edge region 14b are in an ascending stepwise distribution.

In this embodiment, photo spacers 13 of different heights are designed according to the distribution of stress in different regions of the display panel 1 during bending, and the stress on the liquid crystal in the liquid crystal layer 14 is dispersed by different elastic deformation forces of the photo spacers 13 at different positions, so as to maintain a constant gap between the CF substrate 11 and the TFT substrate 12, a difference in optical path difference between different regions of the liquid crystal layer 14 is avoided, and a quality of a display image of the display panel 1 is improved.

Of course, during the actual design process, the heights of the photo spacers 13 in the intermediate region 14a and the photo spacers 13 in the edge region 14b can be set according to actual needs.

Second Embodiment

Figure 4:
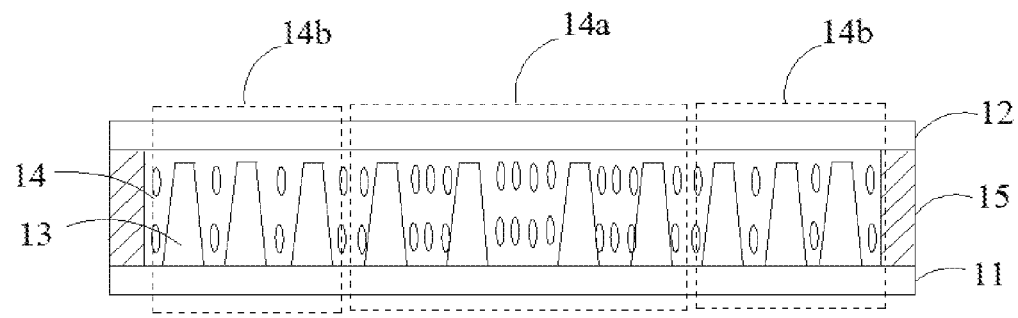
FIG. 4 is a schematic structural view of the display panel before bending in a second embodiment.
Figure 5:
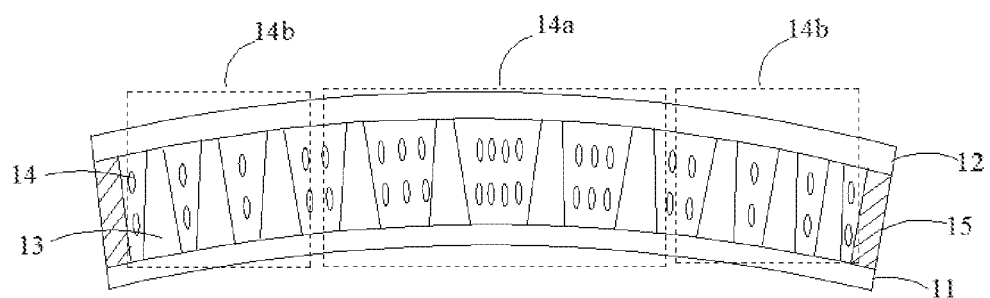
FIG. 5 is a schematic structural view of the display panel after bending in the second embodiment.

Referring to FIG. 4 and FIG. 5, the heights of the photo spacers 13 located in the intermediate region 14a in this embodiment is equal to the heights of the photo spacers 13 located in the edge region 14b, a density of the photo spacers 13 located in the intermediate region 14a is less than the density of the photo spacers located in the edge region 14b.

By setting the density of the photo spacers 13 in the intermediate region 14a smaller than the density of the photo spacers 13 in the edge region 14b, in this way, the density of the photo spacers 13 in the edge region 14b is larger, that is a larger number, to block the liquid crystal in the intermediate region 14a from diffusing into the edge regions 14b on both sides. In addition, since the density of the photo spacer 13 in the edge region 14b is larger, the stress applied to the liquid crystal in the edge region 14b is also larger, so that it is possible to further prevent the liquid crystal located in the intermediate region 14a from diffusing into the edge regions 14a on both sides.

The density of the photo spacers 13 located in the intermediate region 14a gradually increase in the direction from the intermediate region 14a to the edge region 14b, it can be equal increments, that is, an increase value of the density of the photo spacers 13 is equal, or it can also be unequal value increments, that is, the increase value of the density of the photo spacers 13 is not completely equal or unequal, in this case, the density of the photo spacers 13 in the edge region 14b along the direction from the intermediate region 14a to the edge region 14b may be equal, or may not be equal.

The density of the photo spacers 13 located in the edge region 14b gradually increase in the direction from the intermediate region 14a to the edge region 14b, it can be equal increments, that is, an increase value of the density of the photo spacers 13 is equal, or it can also be unequal value increments, that is, the increase value of the density of the photo spacers 13 is not completely equal or unequal, in this case, the density of the photo spacers 13 in the intermediate region 14a along the direction from the intermediate region 14a to the edge region 14b may be equal, or may not be equal.

Preferably, the density of the photo spacers 13 located in the intermediate region 14a increases successively in the direction from the intermediate region 14a to the edge region 14b, and the density of the photo spacers 13 in the edge region 14b increases successively in the direction from the intermediate region 14a to the edge regions 14b, that is, the density of the photo spacers 13 located in the intermediate region 14a and the density of the photo spacers 13 located in the edge region 14b are in an ascending stepwise distribution.

In this embodiment, the density of the photo spacers 13 is designed according to the distribution of stress in different regions of the display panel 1 during bending, and the stress on the liquid crystal in the liquid crystal layer 14 is dispersed by different elastic deformation forces generated by the different density of the photo spacers 13 at different positions, so as to maintain a constant gap between the CF substrate 11 and the TFT substrate 12, a difference in optical path difference between different regions of the liquid crystal layer 14 is avoided, and a quality of a display image of the display panel 1 is improved.

Of course, during the actual design process, the density of the photo spacers 13 in the intermediate region 14a and the photo spacers 13 in the edge region 14b can be set according to actual needs.

Third Embodiment

Figure 6:
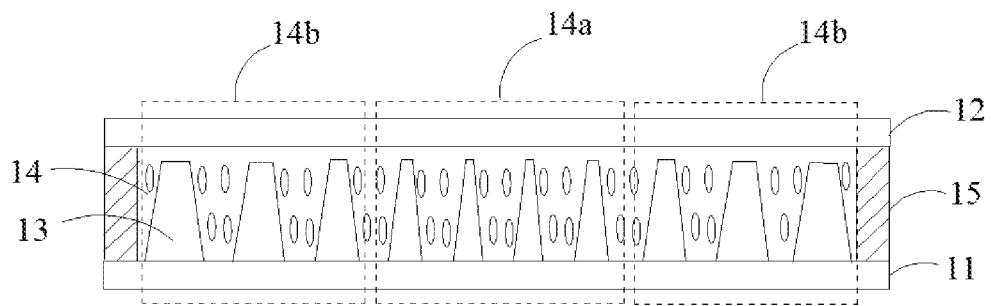
FIG. 6 is a schematic structural view of the display panel before bending in a third embodiment.
Figure 7:
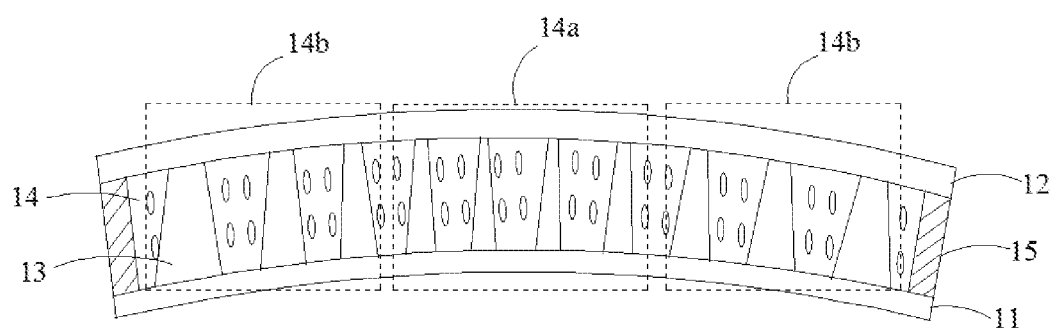
FIG. 7 is a schematic structural view of the display panel after bending in the third embodiment.

Referring to FIG. 6 and FIG. 7, the height and density of the photo spacers 13 in the intermediate region 14a and the photo spacers 13 in the edge region 14b are equal in this embodiment. A maximum length of the photo spacers 13 in the intermediate region 14a in the direction parallel to the CF substrate 11 is smaller than the maximum length of the photo spacer 13 in the edge region 14b in the direction parallel to the CF substrate 11, that is a projected area of the photo spacer 13 in the intermediate region 14a on the CF substrate 11 is smaller than the projected area of the photo spacer 13 in the edge region 14b on the CF substrate 11. Preferably, the maximum length of the photo spacers 13 in the intermediate region 14a in the direction parallel to the CF substrate 11 is smaller than the minimum length of the photo spacers 13 in the edge region 14b in the direction parallel to the CF substrate 11. For example, if the photo spacer 13 is a cylinder, a diameter of the bottom surface of the photo spacer 13 in the intermediate region 14a is smaller than the diameter of the bottom surface of the photo spacer 13 in the edge region 14b. For the photo spacer 13 is a frustum of a cone, the diameters of the top and bottom surfaces of the photo spacer 13 in the intermediate region 14a are both smaller than the top and bottom diameters of the photo spacers 13 in the edge region 14b.

The maximum length of the photo spacers 13 in the intermediate region 14a in the direction parallel to the CF substrate 11 is set to be smaller than the maximum length of the photo spacers 13 located in the edge region 14b in the direction parallel to the CF substrate 11, in this way, the photo spacers 13 located in the edge region 14b are larger in size, so as to block the liquid crystals in the intermediate region 14a from diffusing into the edge regions 14a on both sides. In addition, since the photo spacers 13 in the edge region 14b are larger in size, the stress applied to the liquid crystal in the edge region 14b is also larger, so that it is possible to further prevent the liquid crystal in the intermediate region 14a from diffusing into the edge regions 14a on both sides.

The maximum length in the direction parallel to the CF substrate 11 of the photo spacers 13 located in the intermediate region 14a gradually increase in the direction from the intermediate region 14a to the edge region 14b, it can be equal increments, that is, an increase value of the maximum length in the direction parallel to the CF substrate 11 of the photo spacers 13 is equal, or it can also be unequal value increments, that is, the increase value of the maximum length in the direction parallel to the CF substrate 11 of the photo spacers 13 is not completely equal or unequal, in this case, the maximum length in the direction parallel to the CF substrate 11 of the photo spacers 13 in the edge region 14b along the direction from the intermediate region 14a to the edge region 14b may be equal, or may not be equal.

The maximum length in the direction parallel to the CF substrate 11 of the photo spacers 13 located in the edge region 14b gradually increase in the direction from the intermediate region 14a to the edge region 14b, it can be equal increments, that is, an increase value of the maximum length in the direction parallel to the CF substrate 11 of the photo spacers 13 is equal, or it can also be unequal value increments, that is, the increase value of the maximum length in the direction parallel to the CF substrate 11 of the photo spacers 13 is not completely equal or unequal, in this case, the maximum length in the direction parallel to the CF substrate 11 of the photo spacers 13 in the intermediate region 14a along the direction from the intermediate region 14a to the edge region 14b may be equal, or may not be equal.

Preferably, the maximum length in the direction parallel to the CF substrate 11 of the photo spacers 13 located in the intermediate region 14a increases successively in the direction from the intermediate region 14a to the edge region 14b, and the maximum length in the direction parallel to the CF substrate 11 of the photo spacers 13 in the edge region 14b increases successively in the direction from the intermediate region 14a to the edge regions 14b, that is, the maximum length in the direction parallel to the CF substrate 11 of the photo spacers 13 located in the intermediate region 14a and the maximum length in the direction parallel to the CF substrate 11 of the photo spacers 13 located in the edge region 14b are in an ascending stepwise distribution.

In the present embodiment, the maximum length in the direction parallel to the CF substrate 11 of the photo spacers 13 is designed according to the distribution of the stress in different regions of the display panel 1 during bending, and the stress on the liquid crystal in the liquid crystal layer 14 is dispersed by different elastic deformation forces generated by the different maximum length in the direction parallel to the CF substrate 11 of the photo spacers 13 at different positions, so as to maintain a constant gap between the CF substrate 11 and the TFT substrate 12, a difference in optical path difference between different regions of the liquid crystal layer 14 is avoided, and a quality of a display image of the display panel 1 is improved.

Of course, during the actual design process, the maximum length in the direction parallel to the CF substrate 11 of the photo spacers 13 in the intermediate region 14a and the photo spacers 13 in the edge region 14b can be set according to actual needs.

The foregoing contents are detailed description of the disclosure in conjunction with specific preferred embodiments and concrete embodiments of the disclosure are not limited to these descriptions. For the person skilled in the art of the disclosure, without departing from the concept of the disclosure, simple deductions or substitutions can be made and should be included in the protection scope of the application.

What is claimed is:

1. A display panel, comprising a color filter, CF substrate, a thin film transistor, TFT substrate, a plurality of photo spacers, a liquid crystal layer and a sealing layer, wherein the liquid crystal layer is disposed between the CF substrate and the TFT substrate, the plurality of photo spacers is disposed on a surface of the CF substrate facing the TFT substrate, the sealing layer is disposed between the CF substrate and the TFT substrate and surrounds an edge of the liquid crystal layer, the liquid crystal layer comprises an intermediate region and two edge regions located at two sides of the intermediate region, a stress generated from the photo spacers located in the intermediate region on the liquid crystals in the intermediate region is smaller than the stress generated from the photo spacers located in the edge regions on the liquid crystals in the edge regions, to keep the CF substrate and the TFT substrate at a constant gap;
    wherein the photo spacers located in the two edge regions are symmetrical to the intermediate region, the photo spacers located in the intermediate region are symmetrical to a central axis of the CF substrate; and
    wherein the density of the photo spacers located in the intermediate region gradually increases in a direction from the intermediate region to the edge region, and the density of the photo spacers located in the edge region gradually increases in a direction from the intermediate region to the edge region.

2. The display panel according to claim 1, wherein heights of the photo spacers in the intermediate region are smaller than the heights of the photo spacers in the edge region.

3. The display panel according to claim 2, wherein heights of the photo spacers located in the intermediate region gradually increase in a direction from the intermediate region to the edge region.

4. The display panel according to claim 3, wherein heights of the photo spacers located in the edge region gradually increase in a direction from the intermediate region to the edge region.

5. The display panel according to claim 2, wherein heights of the photo spacers located in the edge region gradually increase in a direction from the intermediate region to the edge region.

6. The display panel according to claim 1, wherein a maximum length in the direction parallel to the CF substrate of the photo spacers in the intermediate region is smaller than the maximum length in the direction parallel to the CF substrate of the photo spacers located in the edge region.

7. The display panel according to claim 6, wherein the maximum length in the direction parallel to the CF substrate of the photo spacers located in the intermediate region gradually increases in a direction from the intermediate region to the edge region, and/or the maximum length in the direction parallel to the CF substrate of the photo spacers located in the edge region gradually increases in a direction from the intermediate region to the edge region.

8. A curved display device, comprising a display panel, wherein the display panel comprises a color filter, CF substrate, a thin film transistor, TFT substrate, a plurality of photo spacers, a liquid crystal layer and a sealing layer, the liquid crystal layer is disposed between the CF substrate and the TFT substrate, the plurality of photo spacers is disposed on a surface of the CF substrate facing the TFT substrate, the sealing layer is disposed between the CF substrate and the TFT substrate and surrounds an edge of the liquid crystal layer, the liquid crystal layer comprises an intermediate region and two edge regions located at two sides of the intermediate region, a stress generated from the photo spacers located in the intermediate region on the liquid crystals in the intermediate region is smaller than the stress generated from the photo spacers located in the edge regions on the liquid crystals in the edge regions, to keep the CF substrate and the TFT substrate at a constant gap;
    wherein the photo spacers located in the two edge regions are symmetrical to the intermediate region, the photo spacers located in the intermediate region are symmetrical to a central axis of the CF substrate; and
    wherein the density of the photo spacers located in the intermediate region gradually increases in a direction from the intermediate region to the edge region, and the density of the photo spacers located in the edge region gradually increases in a direction from the intermediate region to the edge region.

9. The curved display device according to claim 8, wherein heights of the photo spacers in the intermediate region are smaller than the heights of the photo spacers in the edge region.

10. The curved display device according to claim 9, wherein heights of the photo spacers located in the intermediate region gradually increase in a direction from the intermediate region to the edge region.

11. The curved display device according to claim 10, wherein heights of the photo spacers located in the edge region gradually increase in a direction from the intermediate region to the edge region.

12. The curved display device according to claim 9, wherein heights of the photo spacers located in the edge region gradually increase in a direction from the intermediate region to the edge region.

13. The curved display device according to claim 8, wherein a maximum length in the direction parallel to the CF substrate of the photo spacers in the intermediate region is smaller than the maximum length in the direction parallel to the CF substrate of the photo spacers located in the edge region.

14. The curved display device according to claim 13, wherein the maximum length in the direction parallel to the CF substrate of the photo spacers located in the intermediate region gradually increases in a direction from the intermediate region to the edge region, and/or the maximum length in the direction parallel to the CF substrate of the photo spacers located in the edge region gradually increases in a direction from the intermediate region to the edge region.

\* \* \* \* \*